United States Patent Office 2,790,297
Patented Apr. 30, 1957

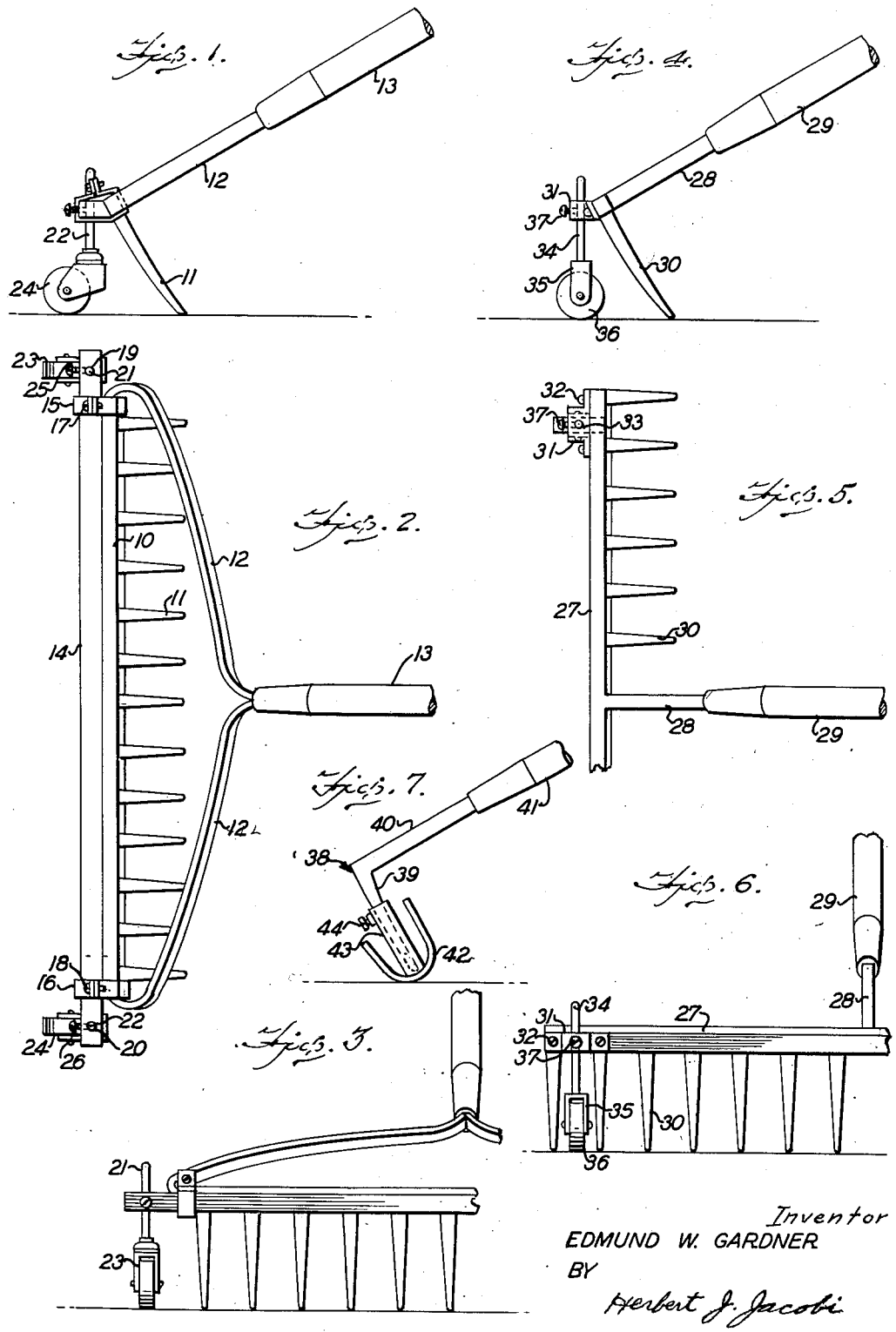

2,790,297

HAND RAKE WITH GUARD ATTACHMENT

Edmund Winston Gardner, La Junta, Colo.

Application March 4, 1954, Serial No. 413,990

2 Claims. (Cl. 56—400.14)

This invention relates to agriculture and more particularly to an attachment for the ordinary variety of garden rake, which attachment affords means to adjust or limit the depth of penetration of the teeth of the rake.

Heretofore, numerous devices of this nature have been proposed but many of these were unsatisfactory, due to excessive weight, complicated structures which rendered the same expensive and liable to damage, as well as being relatively inconvenient to adjust.

It is therefore, an object of this inventoin to provide an attachment for conventional garden rakes which are of lightweight construction and which will serve to adjustably limit the depth of penetration of the teeth of such rakes.

A further object of the invention is the provision of an attachment for garden rakes which may be conveniently attached to, or removed therefrom and which serves to adjustably limit the depth of penetration of the teeth of such rakes.

A still further object of the invention is the provision of an attachment for conventional garden rakes which may be attached thereto without modification of the rake and which will serve to adjustably limit the depth of penetration of the teeth of such rakes.

Another object of the invention is the provision of an attachment for conventional garden rakes which may be permanently applied thereto, but in which the means for limiting the depth of penetration of the teeth may be removed or attached at will.

A further object of the invention is the provision of an attachment for conventional garden rakes for limiting the depth of penetration of the teeth of such rakes, which attachment may be applied to selected teeth of the rake.

Further objects and advantages of the invention will be apparent from the following description taken in conjunction with the accompanying drawing wherein:

Fig. 1 is a side elevational view of a conventional rake showing one form of the attachment of this invention in place thereon;

Fig. 2 a top plan view of the form of the invention shown in Fig. 1;

Fig. 3 a fragmentary end elevational view of the form of the invention shown in Fig. 1;

Fig. 4 a side elevational view of a modified form of the attachment for a rake constructed in accordance with this invention;

Fig. 5 a fragmentary, top plan view of the modified form of the invention shown in Fig. 4;

Fig. 6 a fragmentary end elevational view of the modified form of the invention shown in Fig. 4; and Fig. 7 a side elevational view of a still further modified form of an attachment for a rake and constructed in accordance with this invention.

With continued reference to the drawing there is shown in Figs. 1 to 3, a conventional garden rake having a cross bar 10 from which extend a plurality of substantially parallel teeth 11, there being rearwardly and inwardly extending arms 12 integral with the bar 10 or attached thereto adjacent the ends of the bar 10 in any suitable manner, the arms 12 converging and being secured to a conventional elongated handle 13.

Since it is frequently desirable to limit the depth of penetration of the teeth 11, a means for accomplishing this purpose and constructed in accordance with this invention is shown in Figs. 1 to 3 and which may well comprise an elongated bar 14 which may be suitably formed of aluminum or other relatively lightweight material, this bar 14 being secured to the cross bar 10 of the rake by means of suitable clamp members 15 and 16 extending around the bar 14 and the bar 10 of the rake adjacent the ends thereof. The clamp members 15 and 16 may well comprise a metallic strap which is secured together at the ends thereof by screw threaded fastening means or the like 17 and 18.

As best shown in Figs. 2 and 3, the bar 14 may be somewhat longer than the bar 10 of the rake and adjacent each end of the bar 14 there is provided a vertical aperture 19 and 20 which serves to slidably receive the spindle 21 and 22 of conventional caster wheels 23 and 24. Spindles 21 and 22 may be adjustably secured in the apertures 19 and 20 of the bar 14 by set screws 25 and 26 threadedly received in the bar 14 and engaging the spindles 21 and 22.

As will be seen from an inspection of Figs. 1 and 3, the caster wheels 23 and 24 project downwardly and engage the earth or other surface over which the rake is to travel and the teeth 11 will penetrate such surface in accordance with the adjustment of the caster wheels 23 and 24 with relation to the bar 14 secured to the cross bar 10 of the rake. Since the caster wheels 23 and 24 are swiveled on the spindles 21 and 22, these caster wheels will obviously operate regardless of the direction in which the rake is moved.

Obviously, the rake attachment, above described, may be applied to or removed from the rake at will and since the same may be of relatively lightweight construction, little weight will be added to the rake and the operation thereof will not be encumbered in any way.

A modified form of the invention is shown in Figs. 4, 5 and 6 and in this case the cross bar 27 of the rake is provided with a centrally disposed shank 28 which may be secured to a conventional elongated handle 29. Conventional rake teeth 30 project downwardly in substantially parallel relationship from the cross bar 27.

A bracket 31 may be secured to the cross bar 27 of the rake adjacent each end thereof by screw threaded fastening means or the like 32 and each bracket 31 is provided with a vertical aperture 33 which serves to adjustably receive a spindle 34 provided at its lower end with a fork 35 between which is rotatably mounted a ground engaging wheel 36. The spindle 34 may be secured in adjusted position in the aperture 33 in the bracket 31 by a set screw 37 threadedly received in the bracket 31 and engaging the spindle 34.

In this form of the invention the brackets 31 remain as a permanent part of the rake while the spindles 34 carrying the ground engaging wheels 36 may be inserted in the apertures 33 or removed therefrom, at will and of course, such spindles may be adjusted to position the ground engaging wheels 36 at any desired position to adjust the degree of penetration of the teeth 30 of the rake. It will be noted that the brackets 31 and wheels 36 add little weight to the rake and also do not in any way impede the normal use of such rake.

A still further modified form of the invention is shown in Fig. 7 and here the rake 38 is provided with downwardly extending teeth 39 and a centrally disposed shank 40 which is secured to a conventional elongated handle 41. In order to limit penetration of the teeth 39 into the earth or other surface to be engaged by the teeth 39, there may be provided shoes in the form of a curved ground engaging portion 42 from the central portion of which there extends upwardly a sleeve 43 which may be received over one of the teeth 39 as shown in dotted lines in Fig. 7. The sleeve 43 may be retained on the tooth 39 by means of a set screw 44 threadedly received in the sleeve 43 and engaging the tooth 39. As many shoes 42 as may be required may be applied to selected teeth 39 of the rake 38.

This latter form of the invention obviously may be of extremely lightweight construction and since the curved portion 42 of the shoe extends for an appreciable distance each side of the sleeve 43, the same will provide a smooth ground engaging surface which will prevent undue penetration of the teeth 39. Furthermore, the shoe 42 will not become clogged with grass or other debris as might possibly be the case with the wheels, above described, in connection with the other forms of the invention. Furthermore, this form of the invention is extremely economical in construction and may be applied to or removed from the rake at will.

It will be seen that by the above described invention there has been provided several forms of attachment for a conventional garden rake which may be economically manufactured and which will serve to adjustably limit the depth of penetration of the teeth of such rake. These attachments do not materially add to the weight of the rake and are extremely simple and convenient to use.

It will be obvious to those skilled in the art that various changes may be made in the invention without departing from the spirit and scope thereof, and therefore the invention is not limited by that which is shown in the drawing and described in the specification but only as indicated in the appended claims.

What is claimed is:

1. For use with a rake having downwardly extending teeth, a one-piece integral attachment comprising a sleeve to be disposed over one of said teeth, a set screw threadedly received in said sleeve for engagement with said tooth to retain said sleeve thereon and a curved generally U-shaped ground engaging shoe on the outer end of said sleeve to limit penetration of said teeth, the ends of said shoe extending upwardly on opposite sides of said sleeve.

2. For use with a rake having downwardly extending teeth, a one-piece integral attachment comprising a sleeve to be disposed over one of said teeth, means to retain said sleeve on said tooth and a curved generally U-shaped ground engaging shoe on the outer end of said sleeve to limit penetration of said teeth, the ends of said shoe extending upwardly on opposite sides of said sleeve.

References Cited in the file of this patent

UNITED STATES PATENTS

| | | |
|---|---|---|
| 975,871 | Kampfe | Nov. 15, 1910 |
| 1,471,989 | Weis | Oct. 23, 1923 |
| 2,137,608 | Flavin | Nov. 22, 1938 |